US009178699B2

(12) United States Patent
Lambert et al.

(10) Patent No.: US 9,178,699 B2
(45) Date of Patent: Nov. 3, 2015

(54) PUBLIC KEY ENCRYPTION ALGORITHMS FOR HARD LOCK FILE ENCRYPTION (71) Applicants: BlackBerry Limited, Waterloo (CA); Certicom Corp., Mississauga (CA)

(72) Inventors: Robert John Lambert, Cambridge (CA); Daniel Richard L. Brown, Mississauga (CA); Atsushi Yamada, Etobicoke (CA)

(73) Assignees: BlackBerry Limited, Waterloo, Ontario (CA); Certicom Corp., Mississauga, Ontario (CA)

(*) Notice: Subject to any disclaimer, the term of this patent is extended or adjusted under 35 U.S.C. 154(b) by 55 days.

(21) Appl. No.: 14/073,379

(22) Filed: Nov. 6, 2013

(65) Prior Publication Data
US 2015/0124961 A1 May 7, 2015

(51) Int. Cl.
H04L 9/00 (2006.01)
H04L 9/08 (2006.01)
H04L 9/30 (2006.01)
H04L 9/06 (2006.01)
H04L 9/32 (2006.01)

(52) U.S. Cl.
CPC ............ *H04L 9/0861* (2013.01); *H04L 9/0637* (2013.01); *H04L 9/3066* (2013.01); *H04L 9/0841* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 6,963,971 B1* | 11/2005 | Bush et al. | 713/153 |
| 7,903,820 B2 | 3/2011 | Waisbard | |
| 2005/0235148 A1* | 10/2005 | Scheidt et al. | 713/168 |
| 2006/0265595 A1* | 11/2006 | Scottodiluzio | 713/180 |
| 2007/0101133 A1* | 5/2007 | Liu et al. | 713/168 |
| 2007/0165844 A1 | 7/2007 | Little | |
| 2010/0153728 A1 | 6/2010 | Brown | |
| 2011/0208970 A1 | 8/2011 | Brown et al. | |
| 2011/0270748 A1* | 11/2011 | Graham et al. | 705/40 |
| 2011/0307706 A1* | 12/2011 | Fielder | 713/181 |
| 2012/0300925 A1 | 11/2012 | Zaverucha et al. | |
| 2013/0019096 A1* | 1/2013 | Palzer et al. | 713/168 |
| 2013/0145160 A1 | 6/2013 | Bursell | |
| 2013/0287207 A1 | 10/2013 | Zaverucha et al. | |
| 2013/0290712 A1 | 10/2013 | Zaverucha et al. | |
| 2013/0290713 A1 | 10/2013 | Zaverucha et al. | |
| 2015/0003615 A1* | 1/2015 | Vanstone et al. | 380/282 |

OTHER PUBLICATIONS

Announcing the Advanced Encryption Standard (AES); Federal Information Processing Standards Publication 197; Nov. 26, 2001; 51 pages.
Menezes et al.; Chapter 7—"Block Ciphers," Handbook of Applied Cryptography, CRC Press 1996, 61 pages.
Menezes et al.; Chapter 8—"Public Key Encryption," Handbook of Applied Cryptography, CRC Press 1996, 38 pages.
(Continued)

Primary Examiner — Kaveh Abrishamkar
(74) Attorney, Agent, or Firm — Fish & Richardson P.C.

(57) ABSTRACT

In some aspects, an encryption method comprises encrypting a first portion of a message using a first secret key. The first secret key is generated based on the public key of an entity. A one-way function is used to generate a second secret key from the first secret key, and the first secret key is subsequently discarded. A second portion of the message is encrypted using the second secret key. The encrypted first portion of the message and the encrypted second portion of the message are provided to the entity.

14 Claims, 4 Drawing Sheets (56) References Cited

OTHER PUBLICATIONS

Menezes et al.; Chapter 12—"Key Establishment Protocols," Handbook of Applied Cryptography, CRC Press 1996, 54 pages.
Zigbee Specification; Table of Contents; Chapter 4—"Security Services Specification," Zigbee Document 053474r20, Sep. 7, 2012, 118 pages.
European Search Report in European Application No. 14191527.2, dated Apr. 7, 2015, 8 pages.

* cited by examiner

PUBLIC KEY ENCRYPTION ALGORITHMS FOR HARD LOCK FILE ENCRYPTION

BACKGROUND

The following description relates to encrypting data using a public-key encryption process.

Public-key encryption algorithms are often used for secure data communication, for example, in hybrid symmetric/asymmetric schemes and other types of schemes. Some enterprises and standards bodies have specified security standards or policies for the treatment of files while an electronic device is locked. For example, the National Information Assurance Partnership (NIAP) requires that data be encrypted with public-key cryptography and that, once the data is encrypted, the encrypted data not be decryptable until the private key holder returns.

DESCRIPTION OF DRAWINGS

Like reference symbols in the various drawings indicate like elements.

DETAILED DESCRIPTION

Consider a device such as a smartphone, tablet computer, laptop, or other computing device that has been locked by its user, but that may continue to receive a stream of data. For example, the data could be a single long message. It is desirable that the device be able to encrypt this data to a public key associated with the recipient of the data, and that this data only be decryptable when the holder of the private key (e.g. the smartphone user) has unlocked the device and made the private decryption key available. Some existing uses of public-key cryptography do not achieve this.

Some public-key encryption algorithms, such as RSA PKCS #1 Encryption Scheme (part of the Public-Key Cryptography Standards (PKCS), published by RSA Laboratories) or Elliptic Curve Integrated Encryption Scheme (ECIES), encrypt small amounts of data and typically use hybrid asymmetric/symmetric schemes. In such instances, the symmetric key is encrypted by a public key, and the symmetric key is used to encrypt the data. When the stream of data is large or arrives in pieces spread out in time, the hybrid scheme will hold the symmetric key during the entire operation, and the key to decrypt the ciphertext remains available. In some instances, the symmetric key remains on the device when it is locked, and the scheme violates the requirement that the data only be decryptable when the holder of the private key has unlocked the device and made the private decryption key available.

In some implementations, a message can be encrypted using a series of secret keys; each secret key in the series can be used to encrypt a discrete portion of the message, and each secret key can be deleted after it is used. For example, a first portion of a message can be encrypted using a first secret key, and a one-way function can be used to generate a second secret key from the first secret key. The first secret key can be discarded, and a second portion of the message can be encrypted using the second secret key. In cases where the device is locked, the encrypted message is decryptable when the holder of the private key has unlocked the device and has made the private decryption key available.

In some implementations, a public key scheme is used to establish an initial shared secret, and a one-way function can be used to generate a series of secret keys. The shared secret can be encrypted to the private key holder, using, for example, the aforementioned RSA PKCS #1 or ECIES encryption, and the encrypted shared secret securely erased and forgotten. The shared secret can be transported, the shared secret can be established by key agreement (e.g., Diffie-Hellman or another key agreement protocol), the shared secret can a random string (e.g., generated by a random number generator or another system), or the shared secret can be derived in another manner. The one-way function can be used to generate a series of secret keys from the shared secret, and each secret key can be deleted after it is used. The one-way function can be or include, for example, a hash function, a key derivation function, a block cipher operation, or another type of function. The one-way function may, in some cases, be designed to have collision-resistance, pre-image-resistance, and other properties.

Figure 1A:
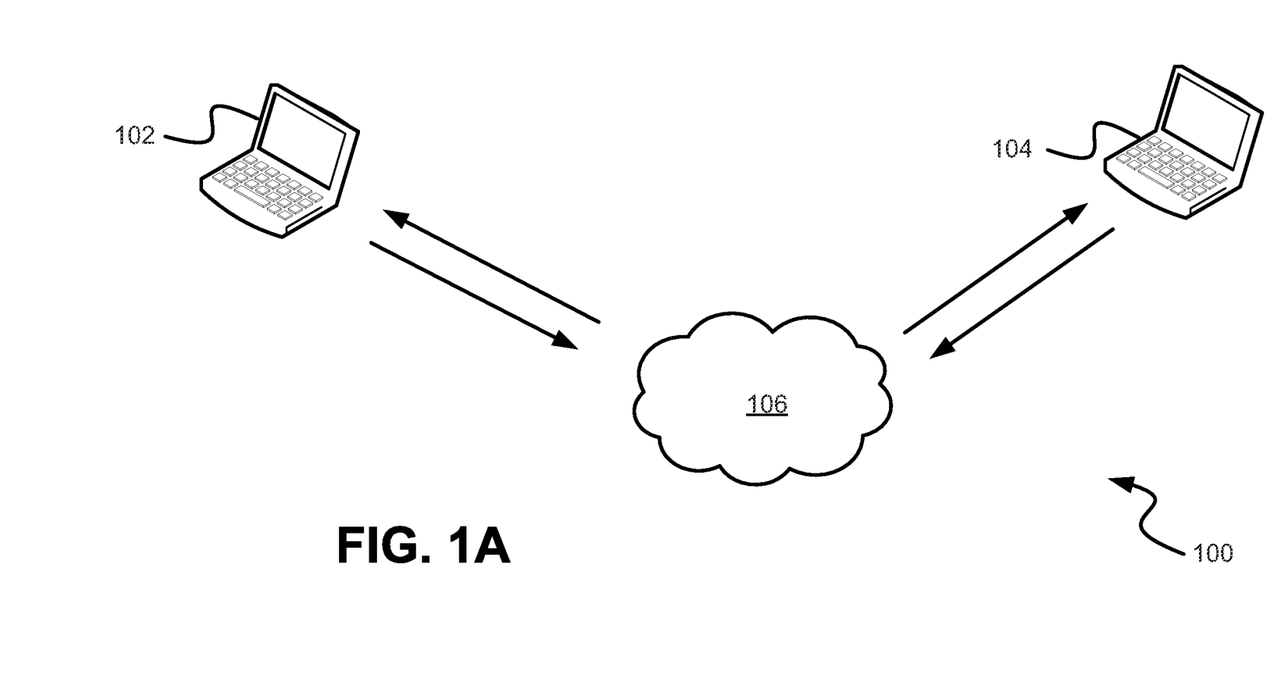
FIG. 1A is a schematic diagram of an example communications system.

FIG. 1A is a schematic diagram of an example data communication system 100. The data communication system 100 includes two terminals 102, 104, and a network 106. The data communication system 100 can include additional, fewer, or different components. For example, the data communication system 100 may include additional storage devices, additional servers, additional terminals, and other features not shown in the figure.

The terminals 102, 104 can communicate with each other and with other components of the data communication system 100 over the network 106. In some implementations, the terminals 102, 104 can exchange encrypted or unencrypted data and other types of information with each other and with other components of the data communication system 100. The data communication system 100 can support additional or different types of communication.

The network 106 can include any suitable type of data communication network. For example, the network 106 can include a wireless or wired network, a cellular network, a telecommunications network, an enterprise network, an application-specific public network, a Local Area Network (LAN), a Wide Area Network (WAN), a private network, a public network (such as the Internet), an ad-hoc network, a WiFi network, a network that includes a satellite link, or another type of data communication network. The network 106 can include a tiered structure defined by firewalls or similar features that implement various levels of security.

The example terminals 102, 104 are computing devices that are generally operable to receive, transmit, process, and store information. Although FIG. 1A shows two terminals 102 and 104, a data communication system 100 may include any number of terminals. The data communication system 100 can include groups or subgroups of terminals that can communicate with each other, but not necessarily with the terminals in other groups or subgroups. The data communication system 100 can include terminals of disparate types, having different types of hardware and software configurations, and in a variety of different locations. In some cases, multiple devices or subsystems can be identified together as a single terminal.

The terminals 102, 104 typically include a data processing apparatus, a data storage medium, and a data communication interface. For example, the terminals 102, 104 can include a memory, a processor, and an input/output controller. A terminal can include user interface devices, for example, a monitor, touchscreen, mouse, or keyboard. The memory of the terminal can store instructions (e.g., computer code) associated with computer applications, programs and computer program modules, and other resources.

The terminals 102, 104 can be implemented as mobile devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded communication devices. For example, the terminals can include messaging devices that are embedded in smart energy meters of a smart energy system. Other types of terminals may also be used.

A terminal can be associated with a particular user entity, a particular user identity, or any combination thereof. One or more of the terminals can be associated with a human user. In some implementations, the terminals are not associated with any particular human user. One or more of the terminals can be associated with a particular device, a particular location, a particular installation, or other identifying information.

Figure 1B:
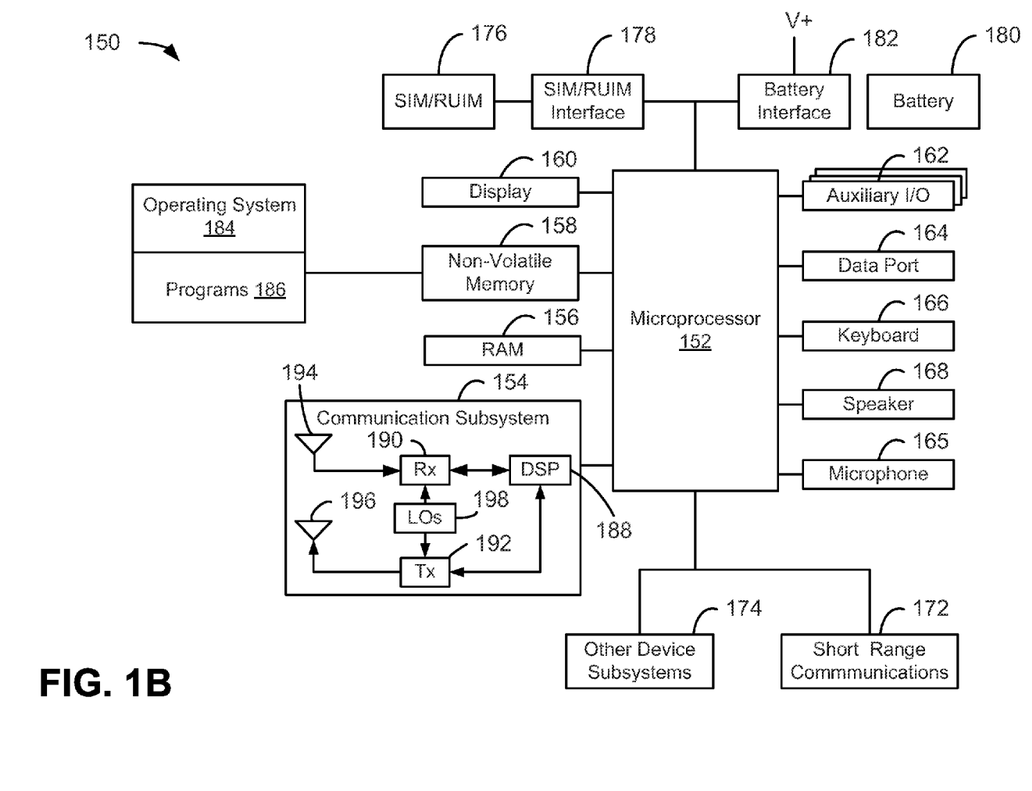
FIG. 1B is a schematic diagram of an example mobile device.

FIG. 1B is a schematic diagram of an example mobile device 150. The example mobile device 150 in FIG. 1B includes a microprocessor 152, a communication subsystem 154, random access memory (RAM) 156, non-volatile memory 158, a display 160, one or more auxiliary input/output (I/O) devices 162, a data port 164, a keyboard 166, a speaker 168, a microphone 170, a short-range wireless communications subsystem 172, other device subsystems 174, a SIM/RUIM card (i.e., a Subscriber Identity Module or a Removable User Identity Module) 176, a SIM/RUIM interface 178, a rechargeable battery 180, a battery interface 182, and possibly other components. A mobile device may include fewer, additional, or different features, which may be arranged and may operate in the manner shown or in a different manner.

The example mobile device 150 shown in FIG. 1B is a two-way communication device having voice and data communication capabilities. The mobile device 150 may communicate over wireless networks, including wireless telecommunication networks, wireless data networks, combined voice and data networks, or other types of wireless networks. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or others.

In the example mobile device 150 shown in FIG. 1B, the communication subsystem 154 includes a receiver 190, a transmitter 192, antennae 194 and 196, one or more local oscillators 198, a digital signal processor (DSP) 188 and possibly other features. The antennae 194 and 196 may include antenna elements of a multiple-element antenna, embedded antennae, radio frequency (RF) antennae, or other types of antennae. The communication subsystem 154 can communicate with a network. The DSP 188 can receive and send signals through the receiver 190 and the transmitter 192, respectively, and the DSP 188 can provide control information to the receiver 190 and the transmitter 192.

In some implementations, the local oscillator 198 provides a reference signal for the receiver 190 and the transmitter 192, for example, where voice and data communications occur at a single frequency, or closely-spaced sets of frequencies. Alternatively, for example if different frequencies are utilized for voice communications and data communications, the local oscillator 198 may include multiple local oscillators that are used to generate multiple different frequencies corresponding to the voice and data networks. Information, which may include both digital voice and digital data information, can be communicated within the mobile device 150 to and from the communication subsystem 154 through a link or bus between the DSP 188 and the microprocessor 152. The design and configuration of the communication subsystem 154, such as frequency band, component selection, power level, etc., may depend on the communication network in which the mobile device 150 is intended to operate.

In some implementations, the mobile device 150 can send and receive communication signals over the wireless network, for example, after wireless network registration or activation procedures have been completed. The wireless network registration or activation procedures for the mobile device 150 may vary based on the type of network or networks with which the mobile device 150 operates. Wireless network access can be associated with a subscriber or user of the mobile device 150. For example, the SIM/RUIM card 176 in the SIM/RUIM interface 178 may identify the subscriber or user of the mobile device 150. With the SIM/RUIM card 176 in the SIM/RUIM interface 178, a subscriber may have access to all subscribed services through the wireless network. For example, subscribed services may include web browsing, e-mail, voice mail, Short Message Service (SMS), Multimedia Messaging Services (MMS), or others.

The data port 164 may include a serial port, a parallel port, or another type of connection port. In some implementations, the data port 164 is a Universal Serial Bus (USB) port or other that includes data lines for data transfer and a supply line that can provide a charging current to charge the battery 180 of the mobile device 150. The mobile device 150 may be manually synchronized with a host system, for example, by connecting the mobile device 150 through the data port 164 (e.g., in an interface cradle or another type of wired connection) that couples the mobile device 150 to a data port of a computer system or other device. The data port 164 may also be used to enable a user to set preferences through an external device or software application, or to download other programs for installation.

The short-range communications subsystem 172 provides for communication between the mobile device 150 and different systems or devices, without the use of the wireless network. For example, the short-range communications subsystem 172 may include an infrared or radio frequency device and associated circuits and components for short-range communication. Examples of short-range communication standards include standards developed by the Infrared Data Association (IrDA), BLUETOOTH®, the 802.11 family of standards developed by IEEE, Near Field Communication (NFC), and others.

The microprocessor 152 manages and controls operation of the mobile device 150. Many types of microprocessors or microcontrollers may be used. Additionally or alternatively, a single DSP 188 may be used to carry out one or more functions of the microprocessor 152. Low-level communication functions, including data and voice communications, may be performed through the DSP 188 in the communication subsystem 154. High-level communication applications, such as voice communication applications, data communication applications, or other types of software applications may be stored in the non-volatile memory 158 for execution by the microprocessor 152. The microprocessor 152 also interacts with other device subsystems, such as the display 160, the RAM 156, the auxiliary input/output (I/O) devices 162, the data port 164, the keyboard 166, the speaker 168, the microphone 170, the SIM/RUIM interface 178, the battery interface 182, the short-range communications subsystem 172, and any other device subsystems generally designated as 174.

The non-volatile memory 158 includes erasable persistent storage, for example, flash memory, battery-backed-up RAM, or other types of memory. In the example shown in FIG. 1B, the non-volatile memory 158 stores instructions and data associated with an operating system 184, programs 186 that provide various types of functionality for the mobile device 150, and other types of information. The non-volatile memory 158 may include a file system to facilitate storage of data items on the device. For example, the operating system 184, the programs 186, or other modules executed on the microprocessor 152 may store, retrieve, modify, delete, or otherwise manipulate data by accessing (e.g., read, write, etc.) the file system provided on the non-volatile memory 158.

Data stored in the non-volatile memory 158 or other computer-readable media on the mobile device 150 may include user application data, text files, image files, voicemail data, and other data generated by the user at the mobile device 150 or received and stored by the mobile device 150. The user application data may include, for example, e-mail message data, address book data, contact information data, calendar appointment data, instant message data, SMS message data, voicemail data, user-entered data, or other types of application data. Voicemail data may include digitized audio recordings or stub entries available for viewing in a messaging application indicating the availability of a voicemail message stored at another location. User-entered data may include text-based, graphic, or other multimedia files loaded onto the mobile device 150 by the user.

The operating system 184 controls low-level functions of the mobile device 150 and facilitates operation of the programs 186. For example, the operating system 184 may provide an interface between one or more of the programs 186 and one or more hardware components on the mobile device 150. The programs 186 include computer program modules that can be executed by the microprocessor 152 (or the DSP 188 in some instances). In some implementations, one or more of the programs 186 are executed by the microprocessor 152 and provide a high-level interface between a user and the mobile device 150. The operating system 184, the programs 186, or both, can include one or more cryptographic modules. For example, a cryptographic module can be implemented as a software module that is executed by the microprocessor 152. The cryptographic module can perform the operations shown in FIGS. 2A and 2B or other operations.

The user interface provided by a program 186 may include a graphical component provided through the display 160, and may additionally include an input/output component provided through the auxiliary I/O devices 162, the keyboard 166, the speaker 168, or the microphone 170. The operating system 184, specific device applications or programs 186, or parts thereof, may be temporarily loaded into a volatile store, such as RAM 156, for faster operation. Moreover, received communication signals may also be temporarily stored to RAM 156 before they are permanently written to a file system in the non-volatile memory 158.

Figure 2A:
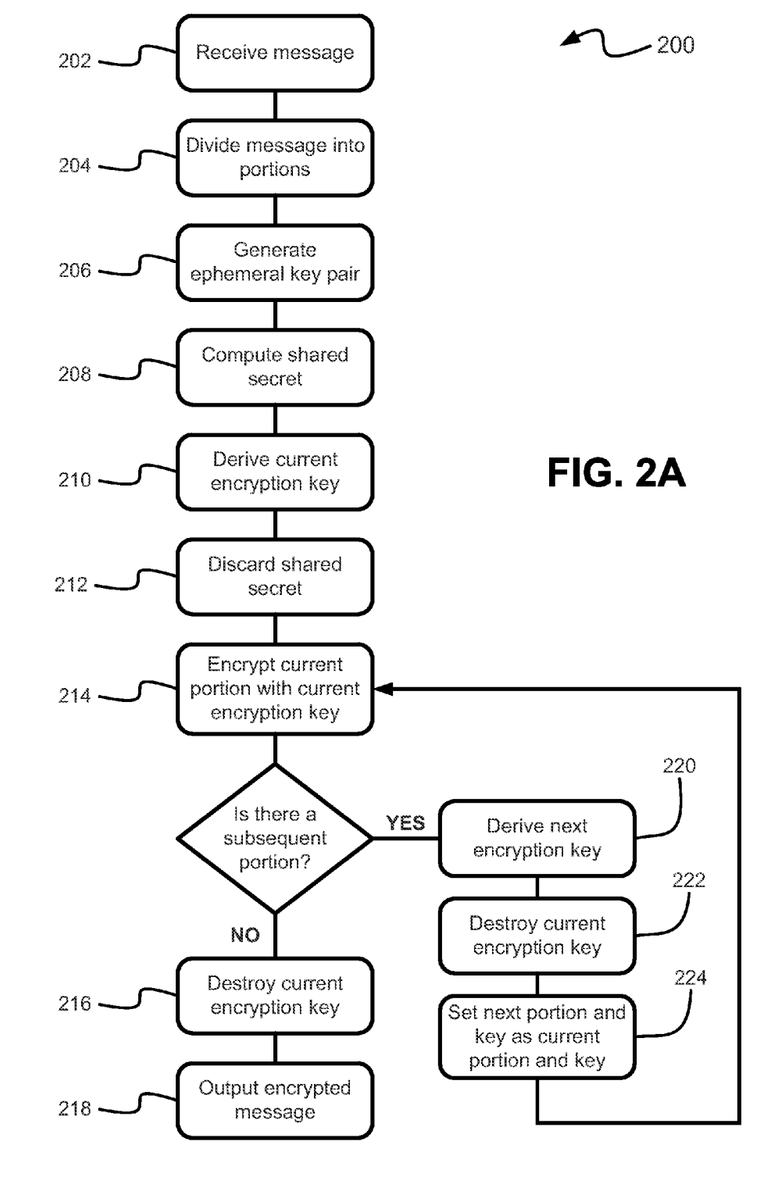
FIG. 2A is a schematic diagram of an example encryption process.

FIG. 2A shows a schematic diagram of an example process 200 for encrypting data. All or part of the example process 200 can be implemented by a computing device or a computing system. For example, the process 200 can be implemented by one or both of the terminals 102, 104 in FIG. 1A, by the mobile device 150 in FIG. 1B, or by another type of device or apparatus. The process 200 can include fewer, additional, or different operations, and the operations can be performed in the order shown in FIG. 2A or in another order. In some instances, an operation or a group of the operations can be iterated or repeated, for example, for a specified number of iterations or until a terminating condition is reached.

The example process 200 processes data and an associated public key to produce encrypted data and an associated ephemeral public key. At 202, data to be encrypted and a public key are received. The data can be any type of data in a format such as plaintext. The public key is associated with a private key as part of a key pair, as in an asymmetrical cryptography scheme. In some cases, the public and private keys are generated in an Elliptic Curve Cryptographic (ECC) scheme, an RSA cryptographic scheme, or another type of scheme.

At 204, the data is divided into working portions. For example, data portions can be implemented as a plurality of blocks. The portions can be the same size or different sizes. One or more portions of the data can be padded before division or during division. In some cases, only one portion is used (i.e., the data is not divided). In some instances, the division of the message may happen later in the encryption process, for example if the message arrives later in pieces. The first portion of the data can initially be set as the "current portion." The current iteration of the encryption process is applied to the current portion of the data.

At 206, an ephemeral key pair that includes an ephemeral public key and an ephemeral private key is generated. In some cases, the ephemeral key pair can be an ECC key pair, an RSA key pair, or another type of key pair. In some implementations, the ephemeral public key is saved for output with the final encrypted data.

At 208, a shared secret is generated based on the input public key received at 202 and the ephemeral private key generated at 206. The shared secret can be generated according to an Elliptic Curve Diffie-Hellman (ECDH) technique or another algorithm. An ECDH scheme is an asymmetrical cryptographic scheme using a public-private key pair as in a Diffie-Hellman scheme. The ECDH scheme uses elliptic curve cryptography to provide the key pair and the shared secret. The ephemeral private key can be discarded after the shared secret has been generated.

In some implementations, the shared secret can be generated and shared in another manner. For example, the secret can be generated (e.g., as a random string or in another manner) and transported. The secret can be transported, for example, by encrypting it to the public key of the entity and providing the public-key encrypted secret to the entity.

At 210, a hash or KDF is applied to the shared secret, the result of which is used to derive information used to encrypt and authenticate the current portion, which components may comprise a current AES key and a current initialization vector (IV) and, if authentication is desired, a Message Authentication Code (MAC) key, such as might be used in, for example, HMAC or some other symmetric authentication scheme. The current AES key, current IV and any other components, such as an HMAC key, can be derived by any deterministic, non-reversible process, such as a hash, KDF, or other cryptographic one-way function. For example, a one-way function such as NIST KDF Alternative 1 using SHA-512 could be used. In some cases, a one-way function can be represented as a function $f$ such that for each x in the domain of $f$, it is easy to compute $f(x)$; but for substantially all y in the range of $f$, it is computationally infeasible to find any x such that $f(x)=y$.

At 212, the shared secret is discarded. Discarding the shared secret can prevent the portion from being decrypted by any agent except for the private key holder. For example, the portion could be decrypted after the user returns and supplies the private key. Deriving a subsequent key using a one-way function as in 210 (and 220) can consume less computation resources than transporting or agreeing upon another shared secret using public-key techniques.

At 214, the current portion is encrypted with the current AES key and the current IV to generate a current ciphertext portion. For example, the encryption could be performed using an AES-256 block cipher in a chained-block cipher (CBC) mode. AES-256 uses a 256-bit key for encryption. In CBC mode, each block of the data is XORed with the previous encrypted block before being encrypted itself. This can ensure that the encryption of each block depends on all previously encrypted blocks.

In some instances, HMAC based on the current IV is applied to the current ciphertext portion, and in some instances a MAC tag associated with the current ciphertext portion can be generated. For example, HMAC-SHA-256 could be used for data integrity. This allows for 256-bit security. Some authenticated encryption modes, such as AES-GCM or AES-CCM, do not provide 256-bit security, for example, because AES's block size is 128 bits.

If the current working portion at 214 is not the last portion of the data, subsequent portions can be encrypted as part of an iterative process. At 220, a subsequent AES key, subsequent IV, and other encryption and authentication components are generated to be used on the subsequent data portion. The subsequent AES key and the subsequent IV can be generated based on the current AES key and the current IV. In some cases, a KDF is applied using the current AES key and the current IV as input to generate the subsequent AES key and subsequent IV. In some cases, the current HMAC key can also be used as input for the KDF, and in some cases the KDF can generate a subsequent HMAC key.

At 222, the current AES key and the current IV are discarded. In this sense, the current AES key and the current IV are not saved by the example process 200 or the device performing the example process 200. The current AES key and the current IV are thus no longer accessible. If an HMAC key exists, it can also be discarded.

Generally, data may be discarded or deleted in a number of different ways. For example, data may be discarded by removing or deleting a pointer to the data, by setting the corresponding bits in memory to zero or some other default values, by overwriting the data one or more times, by randomizing the values of the corresponding bits in memory, or by another technique. As such, each AES key or other symmetric keys or shared secrets can be discarded by these or other techniques.

At 224, the subsequent portion of the message is set to be the current portion, the subsequent AES key is set to be the current AES key, and the subsequent IV is set to be the current IV. In some cases, the subsequent HMAC key is set to the current HMAC key. The new current portion is then encrypted as at 214. No encrypted ciphertext under the new current AES key and new current IV is produced until the subsequent portion of data is ready, which can fulfill requirements for sealed ciphertexts. Any subsequent portions are encrypted similarly as described in 220, 222, and 224.

If the current working portion is the last portion of the data, the current AES key and the current IV are discarded (at 216). At 218, the entire encrypted data is output. The encrypted data can include one encrypted portion or multiple encrypted portions. The ephemeral public key generated at 206 is also output with the encrypted data. In some cases, the HMAC tags for each encrypted portion are output.

Figure 2B:
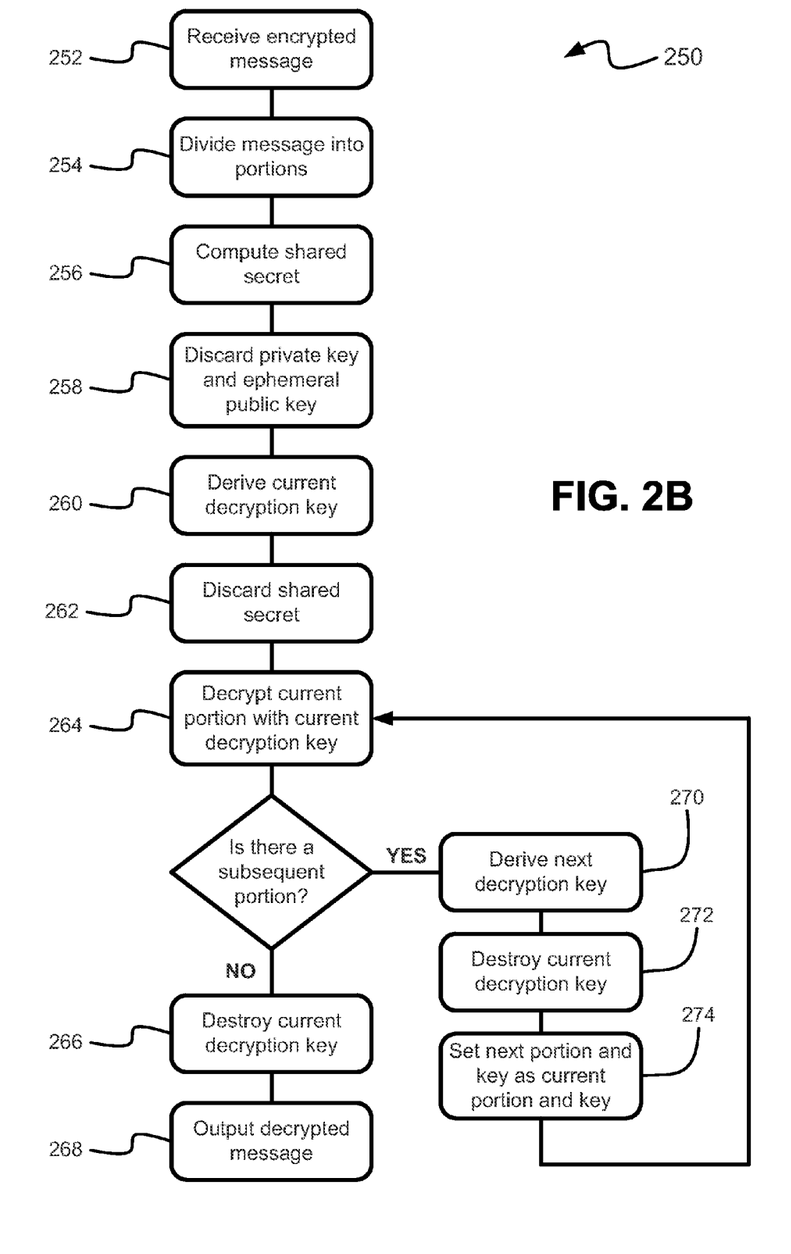
FIG. 2B is a schematic diagram of an example decryption process.

FIG. 2B shows a schematic diagram of an iterative example process 250 for decrypting data. In some instances, the process 250 can be used to decrypt data that has been encrypted by the example process 200 described in FIG. 2A. All or part of the example process 250 can be implemented by a computing device or a computing system. For example, the process 250 can be implemented by the device that encrypted the data, or by a different device. The process 250 can include fewer, additional, or different operations, and the operations can be performed in the order shown in FIG. 2B or in another order. In some instances, an operation or a group of the operations can be iterated or repeated, for example, for a specified number of iterations or until a terminating condition is reached.

The example process 250 processes encrypted data, an associated private key, and an associated ephemeral public key to produce decrypted data. The associated private key is the private key described in example process 200. The associated ephemeral public key is the ephemeral public key generated at 206 during the example process 200. At 252, the encrypted data is received, along with the associated private key and ephemeral public key. In some cases, the HMAC tags for each encrypted portion of the data are also received.

At 254, the encrypted data is divided into working portions. These working portions of the encrypted data correspond to the working portions of the data generated at 204 in the example process 200. The first portion of the encrypted data can be set as the current encrypted portion. The current iteration of the decryption process is applied to the current portion of the encrypted data.

At 256, a shared secret is generated based on the input private key and the ephemeral public key received at 252. The generated shared secret can be the same as that generated at 208 in the example process 200. At 258, the input private key and the ephemeral public key are discarded after the shared secret has been generated.

At 260, a hash or KDF is applied to the shared secret, the result of which is used to derive a current AES key and a current IV for decryption. In some instances, a HMAC key is also derived. At 262, the shared secret is discarded.

At 264, the current encrypted portion is decrypted with the current AES key and the current IV to generate a current decrypted portion. In some instances, HMAC based on the current IV is applied to the current decrypted portion and an HMAC tag is generated. The generated HMAC tag can be compared with the HMAC tag received at 252 to verify data authenticity.

If the current encrypted portion at 264 is not the last portion of the data, subsequent portions can be decrypted as part of an iterative process. At 270, a subsequent AES key and a subsequent IV are generated to be used for decrypting the subsequent data portion. The subsequent AES key and the subsequent IV are generated based on the current AES key and the current IV. In some cases, a KDF is applied using the current AES key and the current IV as input to generate the subsequent AES key and subsequent IV. In some cases, the current HMAC key can also be used as input for the KDF, and in some cases the KDF can generate a subsequent HMAC key.

At 272, the current AES key and the current IV are discarded. In this sense, the current AES key and the current IV are not saved by the system performing the example process 250. The current AES key and the current IV are thus no longer accessible. If an HMAC key exists, it can also be discarded.

At 274, the subsequent portion is set to be the current portion, the subsequent AES key is set to be the current AES key, and the subsequent IV is set to be the current IV. In some cases, the subsequent HMAC key is set to be the current HMAC key. The new current portion is then decrypted as at

264. Any subsequent portions are decrypted similarly as described in 270, 272, and 274.

If the current working portion is the last portion of the data, the current AES key, the current IV, and another component, such authentication keys, are destroyed (at 266). At 268, the decrypted data are output. The decrypted data can include one decrypted portion or multiple decrypted portions. In some cases, the results of validating each portion with HMAC are output also.

In the example process 200, the AES block cipher can be re-keyed for each portion. To avoid the block cipher re-keying and reduce the processing cost, the AES key can be kept static and another data transformation key derived. For example, the initial KDF invocation at 210, whose input is the elliptic curve Diffie-Hellman shared secret generated at 208, can be called with an output length sufficient to provide an AES key, a MAC key (such as for HMAC), and a data transformation key.

The data transformation key can be updated with every portion, while the other keys can stay the same for every portion. The update operation for the data transformation key can be one-way, so that if an adversary obtains the current data transformation key, they will not be able to recover the previous data transformation key values used in earlier portions.

The data transformation key could be used in a low-cost manner by transforming the initial ciphertext obtained from AES-encryption and then using the data transformation key as a simple one-time pad encryption. For example, an XOR operation could be applied between the initial ciphertext and the data transformation key. In other words, the data can be doubly encrypted, first with an AES-encryption (for example, using a CBC) under the static session AES key, and then with XOR-encryption using the evolving data transformation key. Decryption can reverse the order of operations: first decrypt using the current data transformation key value, then decrypt with the AES key. If an adversary obtains the current device, it would be able to recover the data transformation key and the AES key, and decrypt current and future portions. In this case, past portions will have been doubly encrypted.

To reduce costs, the data transformation key could be a single block. In this case, the data transformation key would be smaller in size than the message portion. To use an XOR, the block-size data transformation key can be expanded to the size of a message portion. In some cases, this key expansion could be faster than an AES application. The key expansion could include iterating and incrementing the data transformation key within the portion. This expansion can be implemented without a one-way function or one-way per-portion updating.

In some instances, AES is preferable to hashing-based KDF's (e.g., if AES is available in hardware, or in other contexts), and a one-way function based on AES might be applied to derive the new transformation key or other key. Standard ways of converting block ciphers to hash functions (Davies-Meyer, Matyas-Meyer-Oseas or Miyaguchi-Preneel) can be used.

For example, one could update a data transformation key DK to a new value DK' by DK'=DK^AES(EK, DK), using EK as the AES key, and DK as the plaintext block, where ^ is bitwise XOR. This function is believed to be one-way even if EK is known in the sense that determining DK from DK' is believed infeasible.

The double encryption can either be applied modularly, as outlined above, or in an intertwined fashion. For example, using CBC involves applying XOR to the previous ciphertext block with the current plaintext block before applying the cipher. In a double encryption mode with intertwining, we take the doubly encrypted ciphertext block instead of the usual CBC encrypted block.

Another possible intertwining is to XOR the ciphertext block with the data transformation key block right after the ciphertext has been XORed with the next plaintext block, as usual in CBC mode of encryption. This may require the same number of steps as the previous intertwining but applies the data transformation key, as described previously, to the ciphertext output of the CBC encryption.

In some cases, a counter can be included during key derivation (e.g., at 210, 220). The counter can be derived from the initial shared secret. The counter is incremented at each key derivation and used as a component in the derivation of subsequent keys. This can ensure that the function used to derive keys does not remain constant in the chain of derived keys, and has some variation across usages in time and across devices.

In some cases, the example process 200 and the example process 250 are implemented as multiple functions with a "begin-do-end" structure. The "begin" functions can perform setup and data preparation. The "do" functions can process the data. In some cases the data is supplied to the "do" functions as multiple complete blocks. The "do" functions can also produce ciphertext or receive ciphertext. In some cases, the "do" functions produce or receive authentication tags. The "end" functions can destroy the context of the function (e.g., destroy the symmetric key for a message portion).

The process described herein can be used for encrypting and decrypting any form of data. For example, the data could be a message such as a plaintext message or a media format. In some implementations, the data are files in an encrypted file system. An encrypted file system is a system of storing data in which the data files are individually or collectively encrypted. An encrypted file system requires a user's private key (e.g., a password) to decrypt and access the files.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system can be or include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A public key encryption method comprising:
generating a shared secret based on a public key of an entity and an ephemeral private key;
using a key derivation function to generate a first secret key from the shared secret;
encrypting, by operation of a computing device, a first portion of a message using the first secret key;
using the key derivation function to generate a second secret key from the first secret key;
discarding the first secret key;
encrypting, by operation of the computing device, a second portion of the message using the second secret key;
providing an ephemeral public key associated with the ephemeral private key to the entity; and
providing the encrypted first portion of the message and the encrypted second portion of the message to the entity.

2. The method of claim 1, wherein the key derivation function produces one or more outputs comprising the second secret key, and the key derivation function operates on one or more inputs comprising the first secret key.

3. The method of claim 2, wherein the one or more outputs further comprise at least one of an initialization vector or a key to be used in a message authentication code.

4. The method of claim 1, comprising using an iterative algorithm to encrypt the message, wherein the iterative algorithm comprises, on each respective iteration:
accessing a current portion of the message to be encrypted by the current iteration of the iterative algorithm;
encrypting the current portion of the message using a current secret key generated for the current iteration;
using the key derivation function and the current secret key to generate a subsequent secret key for a subsequent iteration of the iterative algorithm; and
discarding the current secret key before the subsequent iteration.

5. The method of claim 4, wherein the iterative algorithm comprises, on each respective iteration:
incrementing a counter to a new value for the current iteration; and
using the new value of the counter as an input to the key derivation function.

6. The method of claim 1, comprising:

generating multiple distinct secret keys from the ephemeral private key; and using each distinct secret key to encrypt respective, distinct portions of the message.

7. The method of claim 1, wherein generating the first secret key based on the public key of the entity consumes more computational resources than using the key derivation function to generate the second secret key from the first secret key.

8. A non-transitory computer-readable medium comprising instructions that are operable when executed by data processing apparatus to perform public key encryption operations comprising:

generating a shared secret based on a public key of an entity and an ephemeral private key;

using a key derivation function to generate a first secret key from the shared secret;

encrypting a first portion of a message using the first secret key;

using the key derivation function to generate a second secret key from the first secret key;

discarding the first secret key;

encrypting a second portion of the message using the second secret key;

providing the encrypted first and second portions of the message to the entity; and providing an ephemeral public key associated with the ephemeral private key to the entity.

9. The computer-readable medium of claim 8, wherein the key derivation function produces one or more outputs comprising the second secret key, and the key derivation function operates on one or more inputs comprising the first secret key.

10. The computer-readable medium of claim 8, the operations comprising using an iterative algorithm to encrypt the message, wherein the iterative algorithm comprises, on each respective iteration:

accessing a current portion of the message to be encrypted by the current iteration of the iterative algorithm;

encrypting the current portion of the message using a current secret key generated for the current iteration;

using the key derivation function and the current secret key to generate a subsequent secret key for a subsequent iteration of the iterative algorithm; and discarding the current secret key before the subsequent iteration.

11. A device comprising:

one or more processors operable to decrypt a public-key encrypted message by performing operations comprising:

accessing an encrypted message, the encrypted message having been encrypted using multiple secret keys based on a public key of an entity;

generating a shared secret based on an ephemeral public key and a private key of the entity;

using a key derivation function to generate a first secret key based on the shared secret;

decrypting a first portion of the message using the first secret key;

using the key derivation function to generate a second secret key from the first secret key; and decrypting a second portion of the message using the second secret key.

12. The device of claim 11, wherein the key derivation function produces one or more outputs comprising the second secret key, and the key derivation function operates on one or more inputs comprising the first secret key.

13. The device of claim 11, the operations comprising using an iterative algorithm to decrypt the message, wherein the iterative algorithm comprises, on each respective iteration:

accessing a current portion of the message to be decrypted by the current iteration of the iterative algorithm;

decrypting the current portion of the message using a current secret key generated for the current iteration of the iterative algorithm;

using the key derivation function and the current secret key to generate a subsequent secret key for a subsequent iteration; and discarding the current secret key before the subsequent iteration.

14. The device of claim 11, the operations comprising:

generating multiple distinct secret keys from the ephemeral public key; and using each distinct secret key to decrypt respective, distinct portions of the message.

* * * * *